United States Patent [19]
Börjesson et al.

[11] Patent Number: 5,501,293
[45] Date of Patent: Mar. 26, 1996

[54] SAFETY BELT RETRACTOR

[75] Inventors: Bengt Börjesson, West Bloomfield; James T. Hoskyns, Lake Orion, both of Mich.

[73] Assignee: Autoliv Development AB, Vargarda, Sweden

[21] Appl. No.: 376,349

[22] Filed: Jan. 23, 1995

[51] Int. Cl.$^6$ ................................................ B60R 21/00
[52] U.S. Cl. .......................... 180/268; 280/806; 280/735
[58] Field of Search ............................ 180/268; 280/735, 280/806, 807

[56] References Cited

U.S. PATENT DOCUMENTS

| | | | |
|---|---|---|---|
| 4,666,097 | 5/1987 | Tsuge et al. | 180/268 |
| 4,669,680 | 6/1987 | Nishimura et al. | 180/268 |
| 4,714,274 | 12/1987 | Nagashima | 280/806 |
| 4,834,208 | 5/1989 | Kagami et al. | 180/268 |
| 4,858,953 | 8/1989 | Nishimura et al. | 280/807 |

*Primary Examiner*—Kenneth R. Rice
*Attorney, Agent, or Firm*—Spencer & Frank

[57] ABSTRACT

A retractor for a vehicle safety belt comprises a housing, a spindle rotatably mounted within the housing and to which one end of a safety belt is attached, the spindle being spring-biased for retracting the safety belt so that the belt is wound around the spindle. The retractor has a sensor adapted to provide a signal indicative of whether the safety belt is retracted and not in use or is withdrawn from the spindle and in use. The sensor provides said signal in dependence upon the length of safety belt withdrawn from the spindle, with means transmitting movement of the spindle to an element which activates the sensor, said means comprising a gear train, one component of which is coupled directly to the spindle. The means which transmit movement of the spindle to the element which activates the sensor cause the element to adopt a unique position upon withdrawal of any one particular length of safety belt.

22 Claims, 4 Drawing Sheets

SAFETY BELT RETRACTOR

BACKGROUND OF THE INVENTION

The present invention relates to a safety belt retractor such as a safety belt retractor intended for use within a motor vehicle. More particularly the invention is concerned with a safety belt retractor incorporating an arrangement to provide an indication as to whether or not the safety belt is being used by an occupant in a motor vehicle.

In some countries it is a legal requirement that, where fitted, a safety belt be worn by an occupant of a motor vehicle. It is known to provide a motor vehicle with means for providing an audible or visual alarm when an occupant in the vehicle does not wear a safety belt.

It is known, for example, to provide an electric switch within the buckle of a safety belt arrangement in a motor vehicle, the switch providing a signal which indicates whether or not a tongue connected to the safety belt has been latched within the buckle. Such an arrangement requires the provision of an additional electrical connection to the buckle of the safety belt arrangement. It would be preferable if such a switch could be provided within the main body of the safety belt retractor where there may already be an electrical connection to a sensor or other component which is electrically powered.

It has also been proposed previously to provide a switch which is controlled by means of a pivoted arm which is spring biased into engagement with the webbing of a safety belt wound upon the spool of a retractor. The angular position of the arm provides an indication of the amount of webbing wound on the spool and thus the switch may provide a signal to indicate that the safety belt is not being used when the angular position of the arm indicates that all of the Webbing is wound on the spool.

This arrangement suffers, however, from the disadvantage that it causes a not insignificant amount of frictional resistance against rotation of the spool thereby necessitating the use of a stronger spring to wind the safety belt webbing onto the spool. The use of a stronger spring in turn makes the safety belt more uncomfortable to wear because it will impart greater tension to the belt so that the belt will feel particularly tight when being worn by an occupant in the vehicle. In addition the pivoted arm can cause a considerable amount of wear of the webbing which may, in the long term, result in weakening of the webbing.

Furthermore, in some retractor designs a relatively long spool or spindle is used, the length of which is greater than the width of the safety belt webbing. With such a spool the webbing may be spread over the length of the spool when it is fully wound thereon or, alternatively, the webbing may be wound on top of itself so that it is "concentrated" in one section of the spool. It will therefore be appreciated that with a spool of this type the diameter of the webbing wound upon the spool may not give a true reflection of the amount of webbing actually present on the spool.

The use of an arrangement for indicating when a safety belt is being used such as described above, in combination with a sensor located in a vehicle seat to provide an indication of the presence of an occupant upon the seat enables a signal to be obtained which indicates when an occupant of a vehicle seat is not using the safety belt provided for use with that seat. This signal may then be used to activate an alarm or to control the performance of a safety device such as an air bag.

The present invention seeks to provide an improved safety belt retractor having an arrangement to indicate when the safety belt is being used by an occupant in a motor vehicle.

BRIEF SUMMARY OF THE INVENTION

This invention provides a retractor for a vehicle safety belt, the retractor comprising a housing, a spindle rotatably mounted within the housing and a safety belt, one end of which is attached to the spindle, the spindle being spring-biassed for retracting the safety belt so that the safety belt is wound around the spindle; a sensor adapted to provide a signal indicative of whether the safety belt is wound upon the spindle and not in use or is withdrawn from the housing suggesting that the safety belt is in use; means for activating the sensor; and gear means for transmitting rotational movement of the spindle to the means for activating the sensor; the gear means being coupled to the spindle and causing the means for activating the sensor to adopt a unique position upon withdrawal of any one particular length of safety belt from the spindle and causing activation of the sensor in dependence upon the length of safety belt withdrawn.

Preferably the gear means comprise a first gear element mounted upon the spindle.

Conveniently the means for activating the sensor comprise a rotatably mounted member.

Advantageously the rotatably mounted member is provided with a cam formation, the cam formation engaging and activating the sensor in dependence upon the length of safety belt withdrawn from the spindle.

Preferably the rotatably mounted member comprises a second gear element, the second gear element being connected to the first gear element through the intermediary of a further rotatably mounted member, the further rotatably mounted member carrying additional gear elements which engage the first and second gear elements to establish a gear train between the spindle and the rotatably mounted member constituting the means for activating the sensor.

Conveniently the gear means between the spindle and the means for activating the sensor provide a gear ratio of at least 30:1 such that a single rotation of the means for activating the sensor is accomplished by at least 30 rotations of the spindle.

Most conveniently the gear means between the spindle and the means for activating the sensor provide a gear ratio of approximately 40:1 such that a single rotation of the means for activating the sensor is accomplished by approximately 40 rotations of the spindle.

In an alternative embodiment the means for activating the sensor may comprise a linearly movable member such as a gear rack.

Advantageously the means for activating the sensor cause the sensor to be activated when substantially all of the safety belt is wound upon the spindle and the safety belt is not in use.

The sensor may comprises an electric switch, with the switch being closed by the means for activating the sensor when the safety belt is fully retracted and is not in use.

The invention also provides a safety arrangement comprising a retractor as described and an occupant sensor the occupant sensor being responsive to the presence of an occupant upon a seat in a motor vehicle.

The occupant sensor may comprise a switch located in a seat.

The occupant sensor and the sensor adapted to provide a signal indicative of whether the safety belt is retracted or is withdrawn from the spindle may be used to activate an alarm in the event of a signal indicating that a person is sitting upon the seat and that the safety belt is retracted and is not being used.

The occupant sensor and the sensor adapted to provide a signal indicative of whether the safety belt is retracted or is withdrawn from the spindle may control the performance of a further safety device within the vehicle.

The further safety device may comprise an air bag.

Preferably the retractor further comprises sensor means adapted to provide a signal in response to a length of safety belt being withdrawn from the spindle which suggests that a wearer of the seat belt is leaning forwards.

The signal provided by the sensor means which suggests that a wearer of the seat belt is leaning forwards may be used to control the performance of a further safety device within the vehicle.

The sensor adapted to indicate whether the safety belt is in use and the sensor means may each comprise an electric switch.

Conveniently the sensor and the sensor means are combined in a single unit comprising a potentiometer, the potentiometer providing a signal indicative of whether the safety belt is in use and whether the wearer of the safety belt is leaning forwards.

Preferably the signal from the potentiometer is a continuous function of the length of safety belt withdrawn from the spindle.

BRIEF DESCRIPTION OF THE DRAWINGS

In order that the present invention may be more readily understood and so that further features thereof may be appreciated, the invention will now be described, by way of example, with reference to the accompanying drawings, in which.

DETAILED DESCRIPTION OF PREFERRED EMBODIMENT

Figure 1:
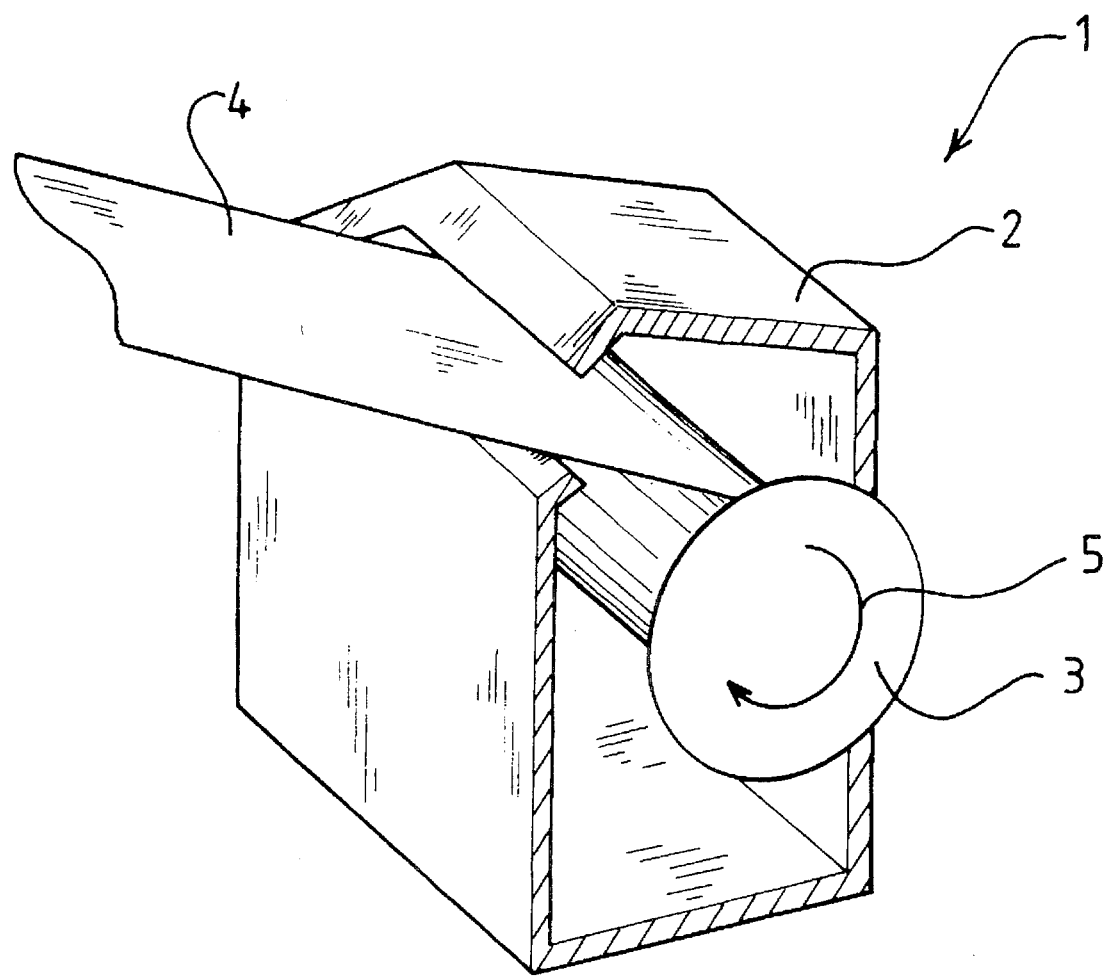
FIG. 1 is a diagrammatic illustration of a safety belt retractor having a housing and a spool upon which a safety belt is wound, with parts of the housing being cut away.

Referring initially to FIG. 1 of the drawings, a retractor mechanism 1 comprises a housing 2 containing a rotatably mounted spool 3 to which one end of a safety belt 4 is connected. The safety belt 4 is designed to be retracted onto the spool 3 and for this purpose a spring (not shown in the drawings) is provided which tends to rotate the spool in a clockwise direction, as indicated by the arrow 5, in order to draw the safety belt 4 into the housing so that it is wound onto the spool. The other end of the safety belt 4 is connected to an anchorage point on the chassis of the motor vehicle so that the safety belt may be withdrawn from the retractor and a tongue (not shown in the drawings) which is connected to the belt can be connected to a buckle in order to provide a "three-point" safety belt restraint.

Whilst in FIG. 1 the housing is shown schematically as forming an enclosure completely covering the retractor, in practice the housing is more likely to take the form of a U-shaped metal frame with the spool being rotatably supported by the arms of the frame which is usually fixed to the chassis of the vehicle in which the retractor is installed. Thus, the term housing is to be understood to cover a frame of this type, which, in use, forms a fixed part of the vehicle.

In common with a conventional safety belt retractor, the retractor of the present invention is provided with a locking mechanism which is actuated in response to either acceleration or deceleration of the vehicle in which the safety belt retractor is mounted in excess of a predetermined limit and/or in response to rapid withdrawal of the safety belt from the housing of the retractor mechanism. The locking mechanism serves to lock the spool 3 in order to prevent any further safety belt from being paid out. Typically the locking mechanism which is responsive to rapid withdrawal of the safety belt from the housing may be responsive to angular acceleration of the spool 3 in excess of a predetermined limit. Such an arrangement is well known in the art.

Figure 2:
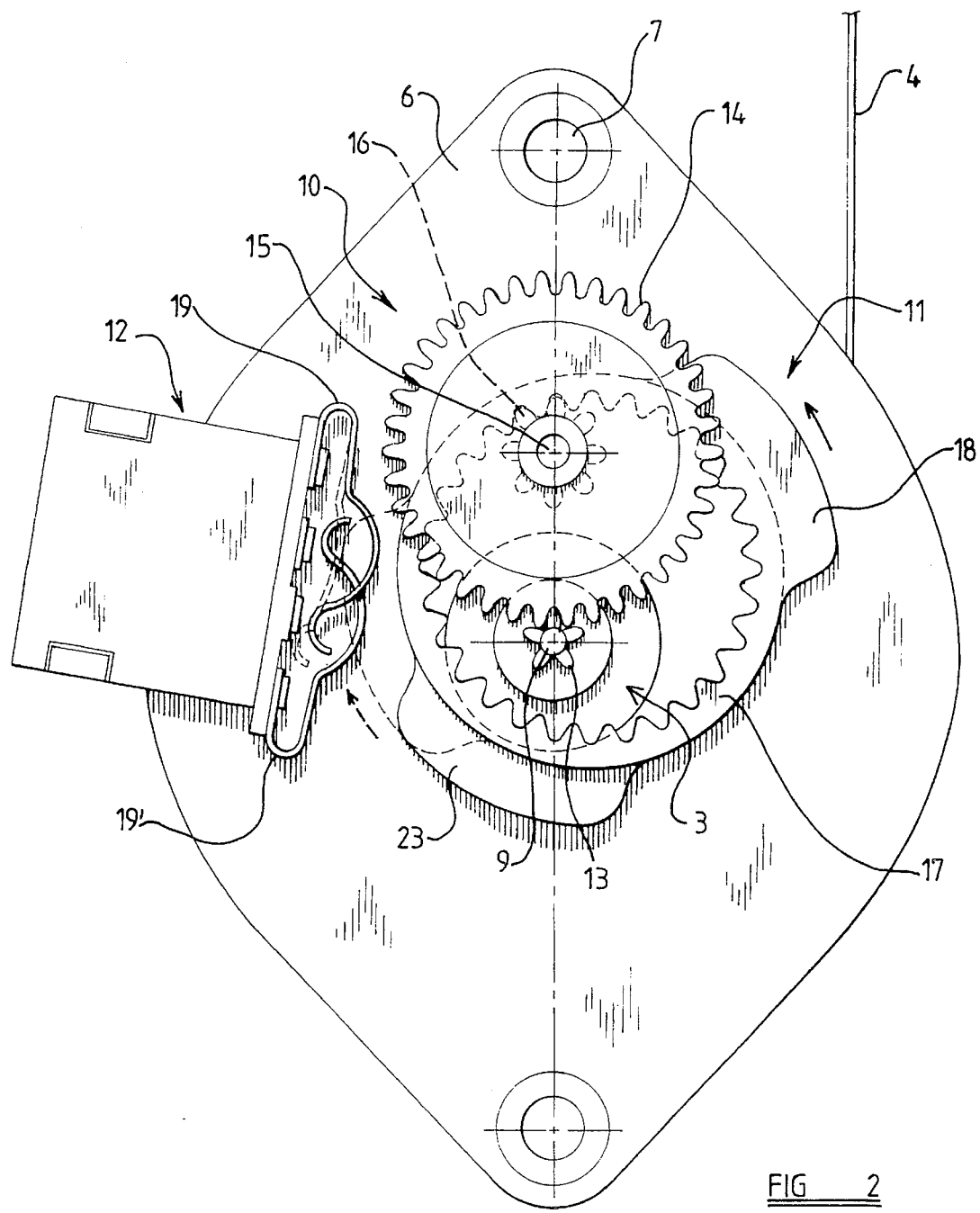
FIG. 2 is an end elevational view of part of the retractor of FIG. 1 illustrating an arrangement provided in the retractor for indicating when the safety belt is not being used.

Referring now to FIG. 2 of the accompanying drawings, a mounting plate 6 which provides support for one end of the spool 3 is illustrated, the mounting plate 6 having apertures 7, 8 by means of which it may be secured in position within the housing 2. The spool 3 of the retractor has a central spindle 9. At one end the central shaft 9 of the spool is provided with an arrangement designed to provide an indication as to whether or not the safety belt 4 is wound on the spool 3 or is withdrawn from the retractor, i.e. an indication as to whether or not the belt is being worn.

The arrangement comprises a gear transmission 10 between the spindle 9 and an element 11 which activates a sensor 12 when the safety belt is not being used and substantially all of the belt is wound on the spindle 9. The gear transmission 10 transmits rotational movement of the spindle 9 to the element 11 and because of the nature of the gear transmission i.e. the fact that it provides a positive drive between the spindle and the element 11, it provides a reliable and accurate indication of the rotational position of the spindle, that is to say the number of rotations of the spindle from the position in which the belt is fully retracted to the position where the belt is in use.

The transmission 10 comprises a first, relatively small gear wheel 13 which is fixed to one end of the spindle 9, the gear wheel 13 meshing with a second, larger gear wheel 14 mounted upon a shaft 15. A third, relatively small gear wheel 16 is also mounted upon the shaft 15, at a position off-set from the gear wheel 14, so as to co-rotate with the gear wheel 14. The third gear wheel 15 meshes with a fourth gear wheel in the form of an internally toothed annulus 17, this fourth gear wheel constituting the element 11 which activates the sensor 12. The annulus 17 is provided with a cam formation 18 on its outer periphery, the cam formation 18 projecting radially outwardly from the annulus and being designed to engage a resilient contact 19 forming part of the sensor 12. The engagement of the cam formation 18 with the resilient contact 19 serves to activate the sensor. The gear transmission 10 is arranged such that the cam formation 18 engages the contact 19 and activates the sensor 12 when the safety belt 4 is not being used i.e. when all or substantially all of the belt 4 is wound on the spindle 9.

When the safety belt 4 is in use and a significant proportion of the belt webbing has been withdrawn from the retractor the gear transmission 10 between the spindle 9 and the element 11 will move the cam formation 18 to the position shown in full lines in FIG. 2 where the formation 18 does not engage the contact 19 of the sensor 12. As the safety belt is retracted into the housing, the spindle 9 rotates in a clockwise direction, causing clockwise rotation of the first gear 13 and anti-clockwise rotation of the second gear 14, the third gear 15 and the annulus 17 so that the cam formation 18 is also rotated anti-clockwise until it reaches the position shown in dotted lines in FIG. 2 where the belt is fully retracted. In this position the cam formation 18 engages the contact 19 of the sensor 12 and activates the sensor. The sensor may take the form of an electric switch.

When the safety belt is withdrawn from the housing of the retractor the spindle will rotate in an anti-clockwise direction, causing the gear wheels to rotate in the opposite direction to that described above so that the annulus carrying the cam formation 18 rotates in a clockwise direction until it reaches a position where the formation 18 is displaced from the contact 19 so that the sensor 12 is no longer activated. The arrangement is designed such that the cam formation 18 will be displaced from the contact 19 of the sensor 12 when a sufficient amount of safety belt webbing 4 has been withdrawn from the retractor to suggest that the belt is being used by an occupant in the vehicle in which the safety belt is mounted.

The gear reduction between the spindle 9 and the element 11 is preferably at least 30 times and most preferably 40 times. Thus, to rotate the element 11 from the position shown in dotted lines, where the belt is fully retracted and the sensor 12 is activated, to the position shown in full lines, i.e. a rotation of approximately 180 degrees, would require at least 15 turns of the spindle 9 and most preferably approximately 20 turns of the spindle. This number of turns of the spindle corresponds to a sufficient length of safety belt webbing 4 being paid out from the retractor to suggest that the belt is being worn by an occupant in the vehicle.

A signal from the sensor 12 can be used to activate an audible and/or visual alarm within the vehicle to remind an occupant that the safety belt must be used or can be used in order to control the performance of other safety devices within the vehicle such as an air bag. Thus, if a signal from the sensor 12 indicates that the safety belt is not being worn then an air bag provided in the vehicle may be inflated in a different manner to that in which it would be inflated if the safety belt was being worn. By way of example, the signal could be used in order to control the point in time at which the air bag is inflated or the pressure or "hardness" to which the air bag is inflated.

Figure 3:
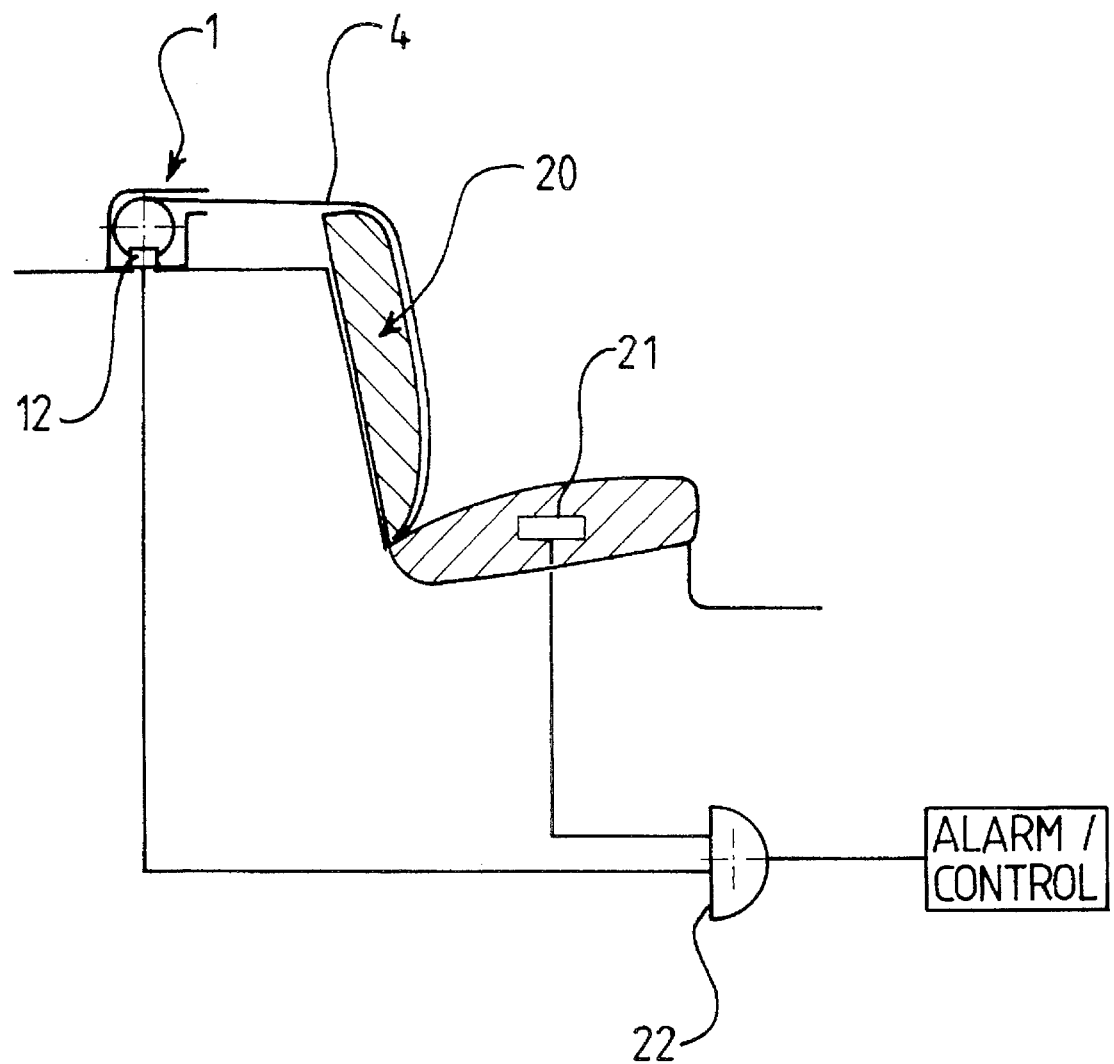
FIG. 3 is a schematic elevation of a vehicle seat provided with a retractor in accordance with this invention and a sensor to indicate when the seat is occupied.

It is envisaged that the signal provided by the sensor 12 may be combined with a signal generated by a seat sensor which provides an indication as to whether a person is occupying the seat. Such an arrangement is illustrated in FIG. 3 where a seat 20 is provided with a sensor 21 which generates an output signal when a person is sitting upon the seat. The signal from the seat sensor 21 is combined with the signal from the sensor 12 of the retractor in such a way that an output is generated when signals are provided by both sensors, i.e. signals which indicate that the seat 20 is occupied and that the safety belt is not being used. Thus, the signals from the seat sensor 21 and the retractor sensor 12 are input to an AND gate 22, the output of which is fed to an alarm and/or used to control the operation of a further safety device mounted in the vehicle. Instead of a seat sensor 21 any other type of sensor capable of providing a signal indicating the presence of a vehicle occupant may be used.

It is further envisaged that the arrangement associated with the retractor, including the sensor 12, may be adapted to provide a signal indicating that an occupant of a seat in a vehicle is leaning forwards within the seat. It will be appreciated that when the safety belt is being worn an additional length of safety belt would be paid out when the wearer leans forward. This could be detected in various ways. In one arrangement (illustrated in FIG. 2) the annulus 17 may be provided with a further cam formation 23 which is off-set both circumferentially and axially from the formation 18 and the sensor 12 may be provided with a second contact 19' which is located alongside the first contact. With this arrangement the further cam formation 23 would come into engagement with the second contact 19' when the annulus 17 has been rotated to a position corresponding to an additional length of safety belt webbing being withdrawn from the retractor to that which would normally be withdrawn when the belt is in normal use, thereby suggesting that the wearer of the belt is leaning forward. In FIG. 2 of the drawings the cam 18 is in the position shown in solid lines when the belt is in normal use and the annulus 17 must execute an additional clockwise rotational movement in order to bring the further cam formation 23 into engagement with the additional contact 19' on the sensor 12 in order to generate a signal to indicate that the wearer of the belt is leaning forwards.

Figure 4:
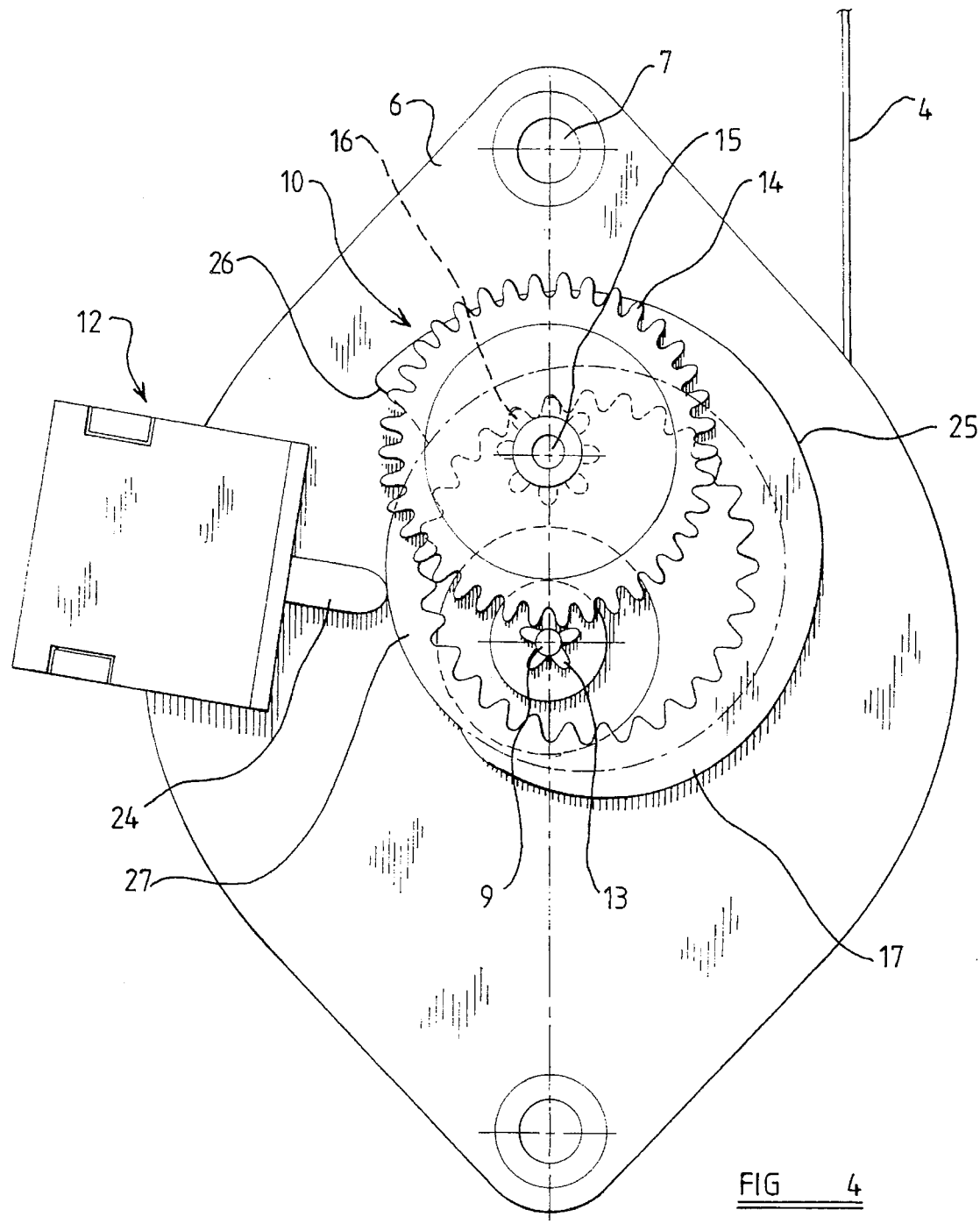
FIG. 4 is an end elevational view of another embodiment of the present invention.

FIG. 4 illustrates another arrangement for providing a signal to indicate that the wearer of the safety belt is leaning forwards. In this further arrangement the annular gear wheel 17 is of a modified form, as is the sensor 12 with which it co-operates. The sensor 12 takes the form of a linear potentiometer having a linearly movable arm 24. The annular gear wheel 17 has an outer surface 25 which engages the free end of the arm 24 of the potentiometer and which is of spiral form, that is to say the annulus 17 is of increasing diameter around a major part of its circumference, there being a discontinuity or step 26 at the junction where the points of maximum and minimum diameter meet. A small region of the outer surface 25 is not of spiral form but bounds a region 27 of the annulus which is of uniform diameter. It will be appreciated that the engagement of the outer surface 25 with the free end of the arm 24 of the potentiometer provides a cam action upon rotation of the annular gear wheel 17 thereby moving the arm 24 of the potentiometer.

FIG. 4 illustrates the arrangement when the safety belt is fully retracted and the end of the arm 24 is in engagement with that part of the surface which is not of spiral form. It will be appreciated that when the safety belt is being worn in the normal manner and the wearer of the belt is sitting in the usual position the annulus 17 will have been rotated in a clockwise direction so that the end of the arm 24 is in engagement with surface 25 at a point where the annulus is of increased diameter and the arm will adopt a first position, providing a signal indicative of the fact that the safety belt is being worn. If the wearer of the belt leans forward then a further length of safety belt will be paid out and the annular gear wheel 17 will rotate further in the clockwise direction so that the region of the annulus 17 which is of even greater diameter will be in engagement with the arm 24 thereby displacing the arm to a different position and generating a signal to indicate that the wearer of the belt is leaning forwards. The arm 24 of the potentiometer is, of course, in constant engagement with the spiral-shaped outer surface 25 of the annulus 17 and the signal provided by the potentiometer is therefore a continuous function of the length of safety belt withdrawn from the spindle 9.

A further alternative would be to provide a second sensor on the retractor, the second sensor being activated by the cam formation 18 when it is at an angular position corresponding to an amount of safety belt webbing having been paid out which suggests that the occupant of a seat is leaning forwards.

The signals from the sensor 12 and/or the additional sensor could then be used in order to control other safety devices within the vehicle such as a safety belt protensioner or an air bag, the operation of which could be modified depending upon whether or not the occupant of a seat is leaning forwards within the seat.

It will be appreciated from the description given above that the invention provides an arrangement which gives an accurate and reliable indication as to whether or not the safety belt webbing 4 has been withdrawn from the retractor, indicating that the belt is in use. Because the spindle 9 is connected directly to the element 11 which activates the sensor 12, by way of the gear transmission 10, the resistance to rotation of the spool which is generated by the arrangement can be kept very low thereby avoiding the need for the use of a particularly strong spring to bias the spindle 9 in a direction to retract the safety belt webbing. In addition it will be appreciated that none of the components of the arrangement are in direct engagement with the safety belt webbing 4 and thus the arrangement does not cause the belt webbing to become worn.

It will be appreciated that various modifications may be made to the arrangement described above without departing from the scope of the present invention. For example, the sensor 12 could be designed so that it is activated when the safety belt is being worn rather than when the safety belt is not being worn with appropriate signal processing ensuring that a signal is generated to give a reliable indication of the state of use of the safety belt. Whilst in the preferred embodiment the element 11 which activates the sensor 12 takes the form of a rotatable, annular gear wheel 17, in an alternative embodiment it could take the form of a linearly movable gear rack provided with a formation which engages the contact 19 of the sensor.

What is claimed is:

1. A retractor for a vehicle safety belt, the retractor comprising a housing, a spindle rotatably mounted within the housing and a safety belt, one end of which is attached to the spindle, the spindle being spring-biassed for retracting the safety belt so that the safety belt is wound around the spindle; a sensor adapted to provide a signal indicative of whether the safety belt is wound upon the spindle and not in use or is withdrawn from the housing suggesting that the safety belt is in use; means for activating the sensor; and gear means for transmitting rotational movement of the spindle to the means for activating the sensor; the gear means being coupled to the spindle and causing the means for activating the sensor to adopt a unique position upon withdrawal of any one particular length of safety belt from the spindle and causing activation of the sensor in dependence upon the length of safety belt withdrawn.

2. A retractor according to claim 1 wherein the gear means comprise a first gear element mounted upon the spindle.

3. A retractor according to claim 2 wherein the means for activating the sensor comprise a rotatably mounted member.

4. A retractor according to claim 3 wherein the rotatably mounted member is provided with a cam formation, the cam formation engaging and activating the sensor in dependence upon the length of safety belt withdrawn from the spindle.

5. A retractor according to claim 3 wherein the rotatably mounted member comprises a second gear element, the second gear element being connected to the first gear element through the intermediary of a further rotatably mounted member, the further rotatably mounted member carrying additional gear elements which engage the first and second gear elements to establish a gear train between the spindle and the rotatably mounted member constituting the means for activating the sensor.

6. A retractor according to claim 1 wherein the gear means between the spindle and the means for activating the sensor provide a gear ratio of at least 30:1 such that a single rotation of the means for activating the sensor is accomplished by at least 30 rotations of the spindle.

7. A retractor according to claim 6 wherein the gear means between the spindle and the means for activating the sensor provide a gear ratio of approximately 40:1 such that a single rotation of the means for activating the sensor is accomplished by approximately 40 rotations of the spindle.

8. A retractor according to claim 2 wherein the means for activating the sensor comprise a linearly movable member.

9. A retractor according to claim 8 wherein the linearly movable member comprises a gear rack.

10. A retractor according to claim 1 wherein the means for activating the sensor cause the sensor to be activated when substantially all of the safety belt is wound upon the spindle and the safety belt is not in use.

11. A retractor according to claim 1 wherein the sensor comprises an electric switch.

12. A retractor according to claim 11 wherein the switch is closed by the means for activating the sensor when the safety belt is fully retracted and is not in use.

13. A safety arrangement comprising a retractor according to claim 1 and an occupant sensor, the occupant sensor being responsive to the presence of an occupant upon a seat in a motor vehicle.

14. A safety arrangement according to claim 13 wherein the occupant sensor comprises a switch located in a seat.

15. A safety arrangement according to claim 13 wherein the occupant sensor and the sensor adapted to provide a signal indicative of whether the safety belt is retracted or is withdrawn from the spindle are used to activate an alarm in the event of a signal indicating that a person is sitting upon the seat and that the safety belt is retracted and is not being used.

16. A safety arrangement according to claim 13 wherein the occupant sensor and the sensor adapted to provide a signal indicative of whether the safety belt is retracted or is withdrawn from the spindle control the performance of a further safety device within the vehicle.

17. A safety arrangement according to claim 16 wherein the further safety device comprises an air bag.

18. A retractor according to claim 1 wherein the retractor further comprises sensor means adapted to provide a signal in response to a length of safety belt being withdrawn from the spindle which suggests that a wearer of the seat belt is leaning forwards.

19. A retractor according to claim 18 wherein the signal provided by the sensor means which suggests that a wearer of the seat belt is leaning forwards is used to control the performance of a further safety device within the vehicle.

20. A retractor according to claim 18 wherein the sensor adapted to indicate whether the safety belt is in use and the sensor means each comprise an electric switch.

21. A retractor according to claim 18 wherein the sensor and the sensor means are combined in a single unit comprising a potentiometer, the potentiometer providing a signal indicative of whether the safety belt is in use and whether the wearer of the safety belt is leaning forwards.

22. A retractor according to claim 21 wherein the signal from the potentiometer is a continuous function of the length of safety belt withdrawn from the spindle.

* * * * *